United States Patent
Toy et al.

[15] 3,656,890
[45] Apr. 18, 1972

[54] CHLORINATED TRISODIUM PHOSPHATES

[72] Inventors: Arthur D. F. Toy, Stamford, Conn.; Russell N. Bell, Ardsley, N.Y.

[73] Assignee: Stouffer Chemical Company, New York, N.Y.

[22] Filed: Sept. 5, 1969

[21] Appl. No.: 855,757

[52] U.S. Cl. ..................... 23/50 R, 252/99, 252/187, 424/149
[51] Int. Cl. ................C01b 11/00, A01b 1/00, C01b 25/16
[58] Field of Search.................23/315, 107, 50 R; 424/149; 252/99, 187

[56] References Cited

UNITED STATES PATENTS 3,525,583   8/1970   Vickers.............................23/50 R Primary Examiner—Oscar R. Vertiz
Assistant Examiner—Hoke S. Miller
Attorney—Wayne C. Jaeschke, Paul J. Juettner and Daniel S. Ortiz

[57] ABSTRACT

Chlorinated trisodium phosphates of high available chlorine contents are produced by including small percentages, e.g. 0.5 percent of alkali metal silicate, e.g., sodium metasilicate in the batch containing sodium phosphates and sodium hypochlorite under chlorination conditions.

6 Claims, No Drawings

CHLORINATED TRISODIUM PHOSPHATES

This invention relates to the production of chlorinated trisodium phosphates, and more particularly, to chlorinated trisodium phosphates of increased available chlorine content.

The commercial process for making chlorinated trisodium phosphate involves adding a solution of sodium hypochlorite to a hot solution of sodium phosphate. The sodium phosphate solution employed is slightly less alkaline than a trisodium phosphate and is usually referred to as a di-tri liquor. The hot mixture is permitted to cool and crystallize to form a product which is believed to have the formula $4(Na_3PO_4 \cdot 11H_2O)$ NaOCl. Impurities also formed in the product include sodium chloride and $Na_2HPO_4 \cdot 2H_2O$. Damp crystals from the batch are passed through a dryer in order to produce the final crystalline product. One major use of the chlorinated trisodium phosphates is in household cleansers. The product is also used in its unadulterated form as a sterilizing agent in food processing plants, dairies, breweries, etc. The active chlorine is provided by the NaOCl moiety. The amount of chlorine which is present in active form is referred to as available chlorine. Available chlorine is defined as twice the stoichiometric amount of chlorine present in the molecule and can be determined by standard methods.

Certain factors have an important influence on available chlorine content. These factors include (1) water content of the batch, (2) amount of hypochloride added to the batch, and (3) $Na_2O$ to $P_2O_5$. We have discovered that the addition of certain materials to the batch also causes increased percentages of the active chlorine to be retained and to show up as available chlorine in the final product. In the practice of the present invention, it has been discovered that the addition of minor percentages of water-soluble alkali metal silicates to the batch of sodium phosphates and sodium hypochlorite substantially improve the available chlorine content of the final product.

Suitable water-soluble, alkali metal silicates include the sodium and potassium metasilicates, e.g. $Na_2SiO_3$, sodium ortho silicates such as $Na_4SiO_4$, silicates such as $K_2Si_4O_9$ as well as alkaline liquid silicates containing varying alkali metal oxide to $SiO_2$ ratios.

The process of the present invention is generally carried out by admixing a solution of sodium phosphate liquor containing a desired $Na_2O$ to $P_2O_5$ ratio and alkali metal hypochlorite in the presence of the desired percentage of the water-soluble, alkali metal silicate. The reaction can be carried out either as a batch or as a continuous process.

Suitable sources of the sodium phosphate starting material are those which will result in an $Na_2O$ to $P_2O_5$ ratio within the desired ranges which are broadly 2:1 to about 3:1 and preferably 2.5:1 to about 2.8:1. Sodium phosphate liquors within these ratios are known as di-tri liquors. These ratios of $Na_2O$ to $P_2O_5$ can be achieved in any suitable manner, e.g., by mixing ortho phosphoric acid and caustic, or by mixing various sodium ortho phosphate salts including the mono- and di-ortho phosphates with caustic or with trisodium ortho phosphate. These mixtures refer to sodium salts of ortho phosphates.

Reaction conditions preferably include providing a di-tri liquor at an elevated temperature in the proximity of its boiling point in order to prevent crystallization. This hot liquor is preferably provided at a temperature between about 85° C. and about 110° C. and most preferably between about 90° C. and about 100° C. at which temperature sodium hypochlorite is added. Most preferably, the water-soluble alkali metal silicate is added to the di-tri liquor such that it is completely dissolved and admixed thoroughly therewith prior to addition of the sodium hypochlorite. If desired, the alkali metal silicate can be dissolved in water prior to admixture with the di-tri liquor. The alkali metal silicate can also be added to the hypochlorite although this procedure is not preferred. When the components have been admixed, they are permitted to cool which results in crystallization of the chlorinated TSP. The crystals are then preferably dried and packaged in any desired manner.

The amount of sodium hypochlorite which is employed relative to sodium phosphate will depend upon the hypochlorite content which is desired in the final product. As previously mentioned, one of the factors which influences the available chlorine content is the percentage of sodium hypochlorite which is added to the mixture. However, at the higher levels, regardless of the percentage of sodium hypochlorite which is added to the mixture, it has been found that the presence of the alkali metal silicate additive improves the chlorine retention in the final product. Generally, the consumer of this type of product desires to have the highest possible available chlorine content, however, practical limits of available chlorine are roughly 3 – 5 percent.

EXAMPLE 1

This example illustrates the preparation of a laboratory batch of chlorinated TSP containing no additive which is employed as a reference standard for this work. About 44 grams of 50 percent sodium hydroxide is mixed with 76 grams of water and heated to about 70° C. in a beaker. Dry particles of $Na_2HPO_4$ are then added to the caustic water mixture in an amount of about 107 grams over a period of about 5 to 10 minutes. The reaction causes the temperature of the resulting mixture to rise to just under 100° C. The hot liquor is then poured into a Hobart kettle-type mixer. When the temperature of the liquor drops to about 90° C., 71 grams of a sodium hypochlorite solution (approximately 24 percent sodium hypochlorite by weight is added. The mixer is permitted to operate until the contents are cooled and crystallized. The contents of the mixer are then removed and air dried for a period of about 30 minutes to 1 hour. The available chlorine content is then measured on the dry product. The determination of available chlorine is that given in *Scotts Standard Methods of Chemical Analysis*, 5th Ed., Vol. 1, p. 289, under "Available Chlorine in Liquid Bleach." Since this material is a dry product, the sample is weighed and dissolved rather than using a measured amount of liquid.

EXAMPLE 2

In this example, the di-tri liquor is prepared in the same manner as specified in Example 1. Prior to hypochlorite addition, however, 1.5 grams of sodium metasilicate, $Na_2SiO_3$, which is in dry powdered form is added to the liquor. Hypochlorite is then added in the manner specified in Example 1.

The available chlorine content of the product is determined by the method referred to in Example 1. In the case of Example 1, the available chlorine content is 4.2 percent and in the case of Example 2, the available chlorine content is 4.69 percent by weight.

In order to assess the effect of addition of varying percentages of alkali metal silicates, additional Example 3 is carried out in the manner described below. It should be noted that the amount of silicate employed in Example 2 is approximately one-half of 1 percent of the total batch. This level of silicate gives a slightly turbid solution. Higher concentrations of silicate would result in even greater turbidity and therefore it is preferred to employ one-half percent or less by weight of the total batch.

EXAMPLE 3

This example is carried out under essentially the same conditions as stated in Example 1 except that 0.75 grams of sodium metasilicate are added in the manner specified in Example 2. This results in an available chlorine content of 4.40.

EXAMPLE 4

This example illustrates the production of chlorinated TSP employing sodium metasilicate additives in plant scale equipment. The product is made by running in a premeasured volume of di-tri liquor at 105° –108° C. into a batch tub. At this point, additive is introduced into the batch tub which is equipped in a manner to provide intimate mixing of the constituents introduced thereto. Solid sodium metasilicate is employed as the additive. A premeasured volume of sodium hypochlorite solution is run into the batch tub and the tub is rotated until fairly dry crystals are obtained. A sample is removed and air dried by raking a thin layer of the sample on a sheet of paper. When the samples are thoroughly dried, available chlorine analyses is determined by the method referred to in Example 1. Reference is made to Table I which summarizes the data obtained in accordance with Example 4 and which indicates improved chlorine retention by reason of the sodium metasilicate additive. This confirms laboratory results.

TABLE I

|  | A | B |
|---|---|---|
| Di-Tri Liquor |  |  |
| B. | 58 | 56.3 |
| Na$_2$O/P$_2$O$_5$ Ratio | 2.58 | 2.58 |
| Gals. added | 92.4 | 89.1 |
| Lbs. | 1284 | 1210 |
| Hypochlorite Liquor |  |  |
| % Avail. Cl | 15.0 | 15.65 |
| % Free NaOH | 5.4 | 5.0 |
| Gals. added | 57.9 | 49 |
| Lbs. | 616 | 522 |
| Additive | None | Sodium Metasilicate |
| Lbs. | — | 6 |
| Total Charge |  |  |
| Lbs. | 1900 | 1738 |
| % Free Moisture | 10.6 | 12.7 |
| % Avail. Cl possible | 5.45 | 5.38 |
| % Actual Avail. Cl found | 4.23 | 4.45 |
| Difference (Avail. Chlorine lost) | 1.22 | 0.93 |

EXAMPLE 5

This example is carried out in essentially the same manner under the same conditions as specified in Examples 1 and 2 except that the alkali metal silicate employed in this case is sodium orthosilicate. It is noted that this additive likewise improved chlorine retention and available chlorine in the product.

EXAMPLE 6

This example is carried out in essentially the same manner as Examples 1 and 2 except that a liquid silicate containing approximately 9 percent of Na$_2$O and 29 percent of SiO$_2$ is employed. Using the same procedure and quantities of di-tri liquor and hypochlorite as given in Example 1, 2.5 grams of the liquid silicate are added to the hot di-tri liquor prior to the hypochlorite addition. The batch is then mixed while allowing it to cool and crystallize. The damp crystals are dried as in Example 1. It is noted that the addition of liquid silicate also improves the available chlorine content of the dried product over that of one prepared in like manner but without an additive.

What is claimed is:

1. A method of making chlorinated trisodium phosphate which comprises admixing aqueous sodium orthophosphate solution and sodium hypochlorite at a temperature between about 85° C. and about 110° C. in the presence of a small amount of the order of about 0.5 percent or less by weight of a water-soluble alkali metal silicate, cooling the resultant mixture, and recovering a crystallized mixture comprising chlorinated trisodium phosphate.

2. The method of claim 1 in which said silicate is selected from the group consisting of sodium and potassium salts of silicates, orthosilicates, metasilicates, and alkaline liquid silicate mixtures.

3. The method of claim 1 in which said silicate is sodium metasilicate.

4. The method of claim 1 in which said silicate is potassium metasilicate.

5. The method of claim 1 in which said silicate is sodium orthosilicate.

6. The method of claim 1 in which said silicate is an alkaline liquid silicate mixture.

* * * * *

PO-1050
(5/69)

UNITED STATES PATENT OFFICE
CERTIFICATE OF CORRECTION

Patent No. 3,656,890                    Dated April 18, 1972

Inventor(s)  Arthur D. F. Toy and Russell N. Bell

It is certified that error appears in the above-identified patent and that said Letters Patent are hereby corrected as shown below:

On the cover page, Assignee: should read -- Stauffer --, delete "Stouffer".

Col. 1, line 27, after "(3)" insert -- the ratio of --.

Col. 3, Table 1, line 25, Move up the word -- metasilicate --

Signed and sealed this 19th day of September 1972.

(SEAL)
Attest:

EDWARD M. FLETCHER, JR.
Attesting Officer

ROBERT GOTTSCHALK
Commissioner of Patents